(12) United States Patent
Balslink

(10) Patent No.: US 8,207,747 B2
(45) Date of Patent: Jun. 26, 2012

(54) SENSOR SYSTEM AND METHOD FOR OPERATING A SENSOR SYSTEM

(75) Inventor: Thorsten Balslink, Reutlinen (DE)

(73) Assignee: Robert Bosch GmbH, Stuttgart (DE)

( * ) Notice: Subject to any disclaimer, the term of this patent is extended or adjusted under 35 U.S.C. 154(b) by 238 days.

(21) Appl. No.: 12/502,022

(22) Filed: Jul. 13, 2009

(65) Prior Publication Data
US 2010/0019777 A1   Jan. 28, 2010

(30) Foreign Application Priority Data

Jul. 24, 2008   (DE) .................. 10 2008 040 682

(51) Int. Cl.
*G01R 27/32*   (2006.01)
(52) U.S. Cl. ............. 324/633; 324/520; 324/600
(58) Field of Classification Search .......... None
See application file for complete search history.

(56) References Cited

U.S. PATENT DOCUMENTS

| | | | |
|---|---|---|---|
| 7,032,443 B2 * | 4/2006 | Moser | 73/146.5 |
| 7,036,372 B2 * | 5/2006 | Chojnacki et al. | 73/504.12 |
| 7,379,800 B2 * | 5/2008 | Breed | 701/29 |

FOREIGN PATENT DOCUMENTS

| | | |
|---|---|---|
| DE | 101 08 197 | 9/2002 |
| DE | 101 08 196 | 10/2002 |
| DE | 102 37 410 | 8/2003 |

* cited by examiner

*Primary Examiner* — Melissa Koval
*Assistant Examiner* — Trung Nguyen
(74) *Attorney, Agent, or Firm* — Kenyon & Kenyon LLP

(57) ABSTRACT

A sensor system includes a first sensor, a second sensor, and an analyzer circuit, the first sensor including a first seismic mass having a first resonance frequency and the second sensor including a second seismic mass having a second resonance frequency, and the analyzer circuit being provided for analyzing a first output signal of the first sensor as well as a second output signal of the second sensor and, moreover, the first resonance frequency being unequal to the second resonance frequency.

11 Claims, 1 Drawing Sheet

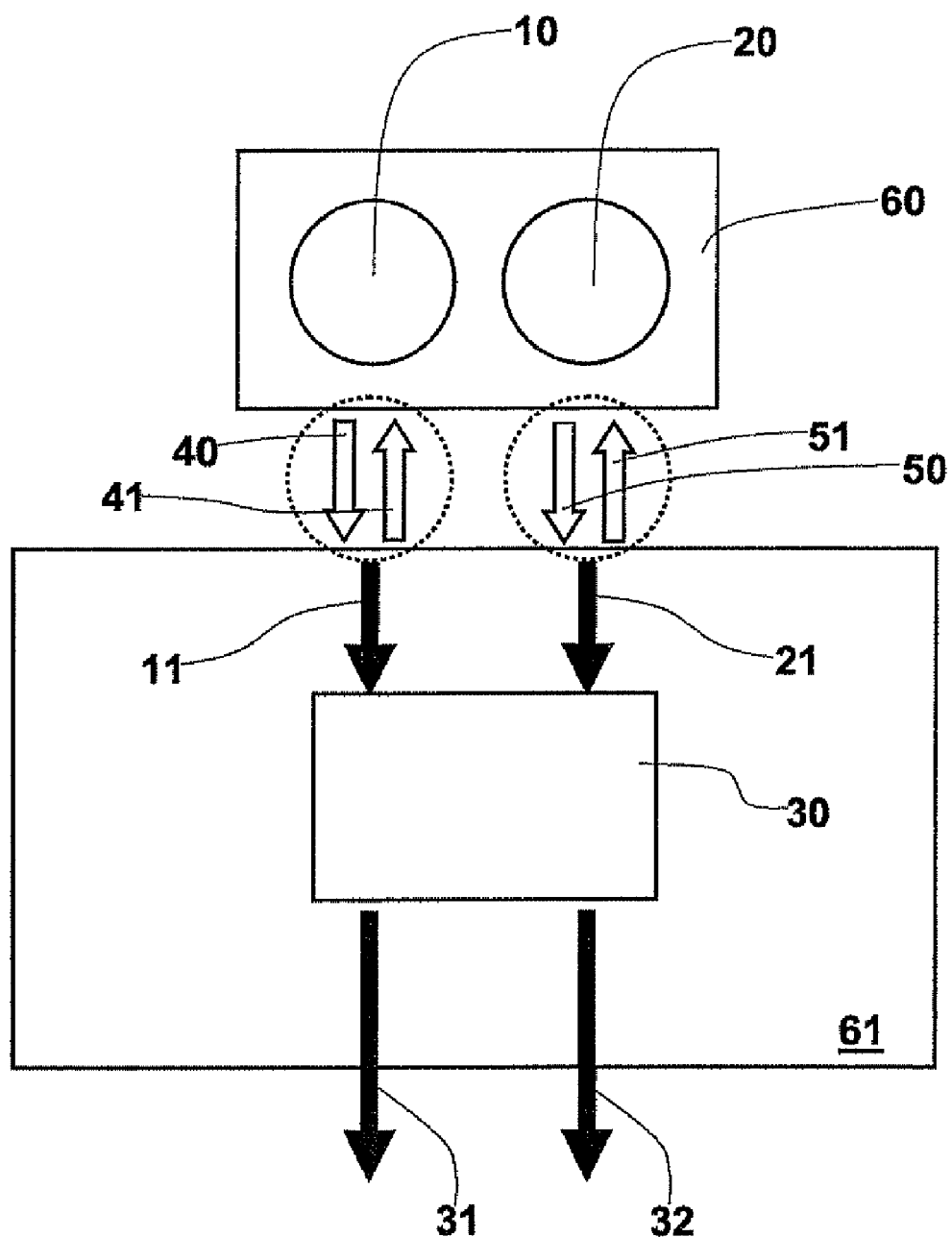

SENSOR SYSTEM AND METHOD FOR OPERATING A SENSOR SYSTEM

BACKGROUND INFORMATION

Sensor systems are generally known. For example, sensor systems having yaw rate sensors are described in German Patent Application Nos. DE 101 08 196, DE 101 08 197, and DE 102 37 410, the yaw rate sensors having Coriolis elements, in particular a first and a second Coriolis element being connected to one another via a spring and are excited to oscillate parallel to a first axis, a first and a second detection means detecting a deflection of the first and the second Coriolis elements due to a Coriolis force acting on the Coriolis elements, so that the difference between a first detection signal of the first detection means and a second detection signal of the second detection means is a function of the Coriolis force and thus also a function of the yaw rate of the yaw rate sensor. These sensor systems are provided for controlling safety systems, such as ESP applications (Electronic Stability Program) in a vehicle, for example. The vehicle's yaw rate about a z-axis is measured for this purpose. In order to optimize the signal-to-noise ratio, the yaw rate sensors are operated, preferably at full resonance, using a working frequency. The disadvantage here is that yaw rate sensors operated at full resonance are comparatively highly interfered with in a defined frequency range around the working frequency due to undesirable parasitic oscillations, such as, for example, natural oscillations of a vehicle body, mechanical switching operations of control units and/or resonances of structural and joining technologies, the defined frequency range being in particular a function of an output filter bandwidth of the sensor system.

SUMMARY OF THE INVENTION

The sensor system according to the present invention and the method according to the present invention for operating a sensor system have the advantage over the related art that, on the one hand, the self-monitoring reliability of the sensor system and, on the other hand, the robustness of the sensor system with respect to undesirable mechanical excitations due to parasitic oscillations are substantially increased. By using the first sensor as well as the second sensor simultaneously it is possible to balance the first output signal with the second output signal via the analyzer circuit, so that an erroneous first and/or an erroneous second output signal is/are detectable by a corresponding difference between the first and the second output signals. By using two different resonance frequencies in the first and in the second sensor, i.e., by using the first and the second resonance frequencies, an undesirable simultaneous excitation of the first sensor or the first seismic mass, as well as of the second sensor or the second seismic mass due to an undesirable parasitic oscillation in a defined range around the first and around the second resonance frequency, for example, due to natural oscillations of a vehicle body, mechanical switching operations of control units and/or resonances of structural and joining technologies, is prevented and only one of the two sensors or seismic masses is comparatively highly interfered with by the undesirable parasitic oscillation, so that only the output signal of this one sensor is correspondingly comparatively highly distorted by the undesirable parasitic oscillation.

This is achieved, in particular, in that the first as well as the second sensor are excited by the parasitic oscillation; however, only in one of the two sensors does the frequency of the parasitic oscillation lie in the defined range of the output filter bandwidth of the sensor system. The analyzer circuit thus measures a difference between the first and the second output signals, so that the distortion of the at least one output signal by the undesirable excitation is detectable. The self-monitoring reliability and the robustness of the sensor system with respect to undesirable parasitic oscillations are thus considerably increased. The frequencies of the first resonance frequency and the second resonance frequency are in particular preferably selected in such a way that the distance between the first and the second resonance frequencies is as great as possible.

According to a preferred refinement, it is provided that the first resonance frequency is unequal to a multiple of the second resonance frequency. A simultaneous undesirable excitation of the first and the second sensors or the first and the second seismic masses caused by the undesirable parasitic oscillation and also by the harmonics of the undesirable parasitic oscillation is particularly advantageously prevented.

According to a further preferred refinement it is provided that the first sensor has first actuating means for exciting the first seismic mass having the first resonance frequency, and the second sensor has second actuating means for exciting the second seismic mass having the second resonance frequency. The first and the second seismic masses are thus in particular preferably excited to a first and a second resonance oscillation parallel to a first direction, so that, parallel to a second direction which is perpendicular to the first direction, a yaw rate causes a first and a second Coriolis acceleration, acting on the first and the second seismic mass, parallel to a third direction which is perpendicular to the first and the second directions. The first seismic mass is deflected by the first Coriolis acceleration to a first deflection parallel to the third direction and the second seismic mass is deflected by the second Coriolis acceleration to a second deflection parallel to the third direction, the first output signal being a function of the first deflection and the first resonance oscillation and the second output signal being a function of the second deflection and the second resonance oscillation. The undesirable parasitic oscillation thus also results, via the excitation of the respective seismic mass, in a distortion of the respective output signal, so that, due to the two different resonance frequencies, a similar distortion of the first and the second output signals is not possible in an advantageous manner and a difference between the first and the second output signals is thus always detectable when the first and the second sensors are influenced by the undesirable parasitic oscillation.

According to a further preferred refinement it is provided that the first sensor has first detection means for detecting a first capacitance change, the first capacitance being a function of a first deflection of the first seismic mass due to a first Coriolis acceleration of the first seismic mass, that the second sensor has second detection means for detecting a second capacitance change, the second capacitance change being a function of a second deflection of the second seismic mass due to a second Coriolis acceleration of the second seismic mass, and the first capacitance change having a first frequency essentially identical to the first resonance frequency and the second capacitance change having a second frequency essentially identical to the second resonance frequency. Particularly advantageously, the first deflection is capacitively measurable via the first detection means and the second deflection is capacitively measurable via the second detection means in a particularly simple and precise manner, the first seismic mass preferably having first electrodes which cooperate with first counterelectrodes on a substrate and the second seismic mass having second electrodes which cooperate with second counterelectrodes on the substrate. The first and the second deflections result in a distance change between the first and the second electrodes and the first and the second counterelectrodes, so that, via a change in the first and the second electrical capacitances between the first and the second electrodes and the first and the second counterelectrodes, the first and the second deflections are measurable using the first and the second detection means.

According to a further preferred refinement it is provided that the first sensor includes a first micromechanical yaw rate sensor and the second sensor includes a second micromechanical yaw rate sensor. Sensor systems having known yaw rate sensors are thus implementable in a particularly advantageous manner, only the first and the second resonance frequencies being differently designed or selected for increasing the self-monitoring reliability and the robustness toward undesirable mechanical excitations caused by parasitic oscillations.

According to a further refinement, it is provided that the sensor system includes an electronic stability program in particular for vehicles. Particularly advantageously are thus yaw rates, in particular about the z-axis (perpendicular to the driving direction and perpendicular to the transverse direction), comparatively reliably detectable, an increase in the self-monitoring reliability and an increase in the robustness with respect to undesirable mechanical excitations caused by parasitic oscillations being particularly important especially in view of maximum vehicle safety and the presence of comparatively many oscillations and vibrations in the vehicle.

A further object of the present invention is a method for operating a sensor system having a first sensor and a second sensor, the first sensor having a first seismic mass and the second sensor having a second seismic mass, the first seismic mass being excited to a first oscillation having a first resonance frequency using first actuating means, characterized in that, using second actuating means, the second seismic mass is excited to a second oscillation having a second resonance frequency unequal to the first resonance frequency. As already described above in greater detail, a simultaneous mechanical excitation of the first as well as the second seismic mass caused by an undesirable parasitic oscillation having a frequency in a defined range around the first or around the second resonance frequency is thus prevented, so that by balancing the first and the second output signals, a parasitic excitation of one of the two seismic masses caused by the undesirable parasitic oscillation is measurable and a distorted output signal is thus detected.

According to a preferred refinement it is provided that the second seismic mass is excited to a second oscillation in such a way that the second resonance frequency is unequal to a multiple of the first resonance frequency, so that a simultaneous undesirable excitation of the first and the second sensors or the first and the second seismic masses and/or an interference of the first and the second oscillations caused by the undesirable parasitic oscillation and also by the harmonics of the undesirable parasitic oscillation is/are particularly advantageously prevented.

According to a further preferred refinement it is provided that a first capacitance change having essentially the first resonance frequency is measured with the aid of first detection means, the first capacitance change being a function of a first deflection of the first seismic mass due to a first Coriolis acceleration of the first seismic mass, and that a second capacitance change having essentially the second resonance frequency is measured with the aid of second detection means, the second capacitance change being a function of a second deflection of the second seismic mass due to a second Coriolis acceleration of the second seismic mass. The first and the second capacitance changes are analyzed by the analyzer circuit in the form of the first and the second output signals and compared to one another, so that an output signal distorted by the undesirable parasitic oscillation is detectable through a difference between the first and the second output signals, preferably above a threshold value. A yaw rate, in particular of a vehicle about the z-axis, is particularly advantageously measurable in a comparatively simple and reliable manner, essentially no similar distortions of the first and the second output signals due to an excitation of the first seismic mass as well as the second seismic mass caused by an undesirable parasitic oscillation occurring.

According to a further preferred refinement it is provided that the first detection means generate a first output signal as a function of the first capacitance change and the second detection means generate a second output signal as a function of the second capacitance change, the first and the second output signals being analyzed by an analyzer circuit and a third output signal and/or an error signal being generated as a function of the first and the second output signals. The first and the second capacitance changes are analyzed in the form of the first and the second output signals and compared with one another, so that an output signal distorted by the undesirable parasitic oscillation is detectable through a difference between the first and the second output signals, preferably above a threshold value, and is output via an error signal.

According to a further refinement it is provided that an electronic stability program, in particular of a vehicle, is operated as a function of the third output signal and/or the error signal. An activity of the electronic stability program is particularly advantageously suppressed due to the detection of the error signal, so that the electronic stability program does not act as a function of distorted output signals, thereby increasing the vehicle safety considerably.

BRIEF DESCRIPTION OF THE DRAWING

FIG. 1 shows a schematic view of a sensor system according to an exemplary specific embodiment of the present invention.

DETAILED DESCRIPTION

FIG. 1 shows a schematic view of a sensor system according to an exemplary specific embodiment of the present invention, the sensor system having a first yaw rate sensor 10 and a second yaw rate sensor 20 which are situated on a shared micromechanical sensor element 60 and are preferably manufactured together. First and second yaw rate sensors 10, 20 are controlled by controller electronics 61 in the form of an ASIC which includes an analyzer circuit 30. First yaw rate sensor 10 has a first seismic mass having a first resonance frequency which is actuated 41 to a first oscillation or a first resonance oscillation having a first resonance frequency with respect to a substrate of micromechanical sensor element 60 using first actuating means. Second yaw rate sensor 20 similarly has a second seismic mass which, with the aid of second actuating means is actuated 51 to a second resonance oscillation having the second resonance frequency with respect to the substrate. The first and second oscillations oscillate parallel to a first direction so that, parallel to a second direction which is perpendicular to the first direction, a yaw rate generates a first Coriolis acceleration acting on the first seismic mass and a second Coriolis acceleration acting on the second seismic mass, the first and the second Coriolis accelerations acting parallel to a third direction which is perpendicular to the first and the second directions, so that the first seismic mass experiences a first deflection parallel to the third direction and the second seismic mass experiences a second deflection parallel to the third direction.

The first and second deflections generate a first and a second electrical capacitance change between a first and a second electrode on the first and the second seismic masses and a first and a second counterelectrode on the substrate, the first and the second capacitance changes being measured using first and second detection means. A first output signal 40 is generated as a function of the first electrical capacitance change and a second output signal 50 is generated as a function of the second electrical capacitance change. First and second output signals 40, 50 are conveyed 11, 21 to analyzer circuit 30 and compared to one another in analyzer circuit 30. Analyzer circuit 30 generates a third output signal 31 which includes a mean value from first and second output signals 40, 50. If the difference between first and second output signals 40, 50 exceeds a freely selectable threshold value, an error signal 32 is output by analyzer circuit 30.

First and second yaw rate sensors 10, 20 and in particular the elastic suspension and/or the mass of the first and second seismic masses are designed in such a way that the first resonance frequency is unequal to the second resonance frequency and also unequal to a multiple of the second resonance frequency. An undesirable parasitic oscillation of micromechanical sensor element 60 having a defined parasitic frequency thus does not result in a simultaneous comparatively strong undesirable excitation of the first as well as the second seismic mass which would be superimposed on the first and second oscillations, at least partially. First and second output signals 40, 50 are a function of the first and second Coriolis accelerations and of the first and second oscillations, so that the comparatively strong undesirable excitation causes a comparatively great change in the respective first or second output signal 40, 50 only in one of the two first or second seismic masses. This comparatively great change results in a difference between the first and the second output signals 40, 50 which is detected by analyzer circuit 30 when the threshold value is exceeded, so that a distortion of the first or the second output signal 40, 50, caused by an undesirable excitation of the first or the second yaw rate sensor 10, 20, by a parasitic frequency in a defined range, in particular in a range dependent on the respective output filter bandwidth of sensor system 1, around the first or around the second resonance frequency, is detected by analyzer circuit 30, since in the ideal case (i.e., essentially without any interference and when first and second yaw rate sensors 10, 20 are identically configured) first and second output signals 40, 50 are almost identical, and, if needed, error signal 32 is output.

The sensor system is preferably integrated into an ESP system (Electronic Stability Program) of a vehicle and measures a yaw rate about the vehicle's z-axis (perpendicular to the driving direction and perpendicular to the vehicle's transverse direction). The error signal is preferably used for temporary deactivation of the ESP system, so that the ESP system does not carry out any activity as a function of a distorted output signal. The advantage is an error, which is smaller by a factor of two, in the event of the interference in only one of the two first and second yaw rate sensors 10, 20. Moreover, the error of third output signal 31 is limited to the predefined threshold value if both yaw rate sensors 10, 20 are not simultaneously comparably excited.

What is claimed is:

1. A sensor system comprising:
    a first sensor including a first seismic mass having a first resonance frequency;
    a second sensor including a second seismic mass having a second resonance frequency, the first resonance frequency being unequal to the second resonance frequency; and
    an analyzer circuit for analyzing a first output signal of the first sensor and a second output signal of the second sensor,
    wherein the first sensor and the second sensor are situated on a shared sensor element, wherein
    the first sensor has first actuating means for exciting the first seismic mass having the first resonance frequency and the second sensor has second actuating means for exciting the second seismic mass having the second resonance frequency.

2. The sensor system according to claim 1, wherein the first resonance frequency is unequal to a multiple of the second resonance frequency.

3. The sensor system according to claim 1, wherein the first sensor includes a first micromechanical yaw rate sensor and the second sensor includes a second micromechanical yaw rate sensor.

4. The sensor system according to claim 1, wherein the sensor system includes an electronic stability program for vehicles.

5. The sensor system according to claim 1, wherein the analyzer circuit generates a third output signal which includes a mean value from first and second output signals.

6. The sensor system according to claim 5, wherein if a difference between the first and the second output signals exceeds a freely selectable threshold value, an error signal is output by the analyzer circuit.

7. A sensor system comprising:
    a first sensor including a first seismic mass having a first resonance frequency;
    a second sensor including a second seismic mass having a second resonance frequency, the first resonance frequency being unequal to the second resonance frequency; and
    an analyzer circuit for analyzing a first output signal of the first sensor and a second output signal of the second sensor,
    wherein the first sensor has first detection means for detecting a first capacitance change, the first capacitance change being a function of a first deflection of the first seismic mass due to a first Coriolis acceleration of the first seismic mass, the second sensor having second detection means for detecting a second capacitance change, the second capacitance change being a function of a second deflection of the second seismic mass due to a second Coriolis acceleration of the second seismic mass, the first capacitance change having a first frequency which is substantially identical to the first resonance frequency and the second capacitance change having a second frequency which is substantially identical to the second resonance frequency.

8. A method for operating a sensor system including a first sensor and a second sensor, the first sensor having a first seismic mass and the second sensor having a second seismic mass, the first sensor and the second sensor situated on a shared sensor element, the method comprising:
    exciting the first seismic mass to a first oscillation having a first resonance frequency with the aid of a first actuating device; and
    exciting the second seismic mass, with the aid of a second actuating device, to a second oscillation having a second resonance frequency which is unequal to the first resonance frequency, wherein the second seismic mass is excited to a second oscillation in such a way that the second resonance frequency is unequal to a multiple of the first resonance frequency.

9. A method for operating a sensor system including a first sensor and a second sensor, the first sensor having a first seismic mass and the second sensor having a second seismic mass, the method comprising:
- exciting the first seismic mass to a first oscillation having a first resonance frequency with the aid of a first actuating device;
- exciting the second seismic mass, with the aid of a second actuating device, to a second oscillation having a second resonance frequency which is unequal to the first resonance frequency;
- measuring a first capacitance change, having substantially the first resonance frequency, using a first detection device, the first capacitance change being a function of a first deflection of the first seismic mass due to a first Coriolis acceleration of the first seismic mass; and
- measuring a second capacitance change, having substantially the second resonance frequency, using a second detection device, the second capacitance change being a function of a second deflection of the second seismic mass due to a second Coriolis acceleration of the second seismic mass.

10. The method according to claim 9, wherein the first detection device generates a first output signal as a function of the first capacitance change and the second detection device generates a second output signal as a function of the second capacitance change, the first and the second output signals being analyzed by an analyzer circuit, and at least one of a third output signal and an error signal being generated by the analyzer circuit as a function of the first and second output signals.

11. The method according to claim 10, further comprising operating an electronic stability program of a vehicle as a function of at least one of the third output signal and the error signal.

* * * * *